United States Patent Office 2,789,962
Patented Apr. 23, 1957

2,789,962

STABILIZATION OF SYNTHETIC RUBBER-MODIFIED POLYSTYRENES WITH ARYL SECONDARY AMINES AND DITHIOCARBAMIC ACID SALTS

Frazier Groff, Plainfield, and Rogers K. Dearing, Westfield, N. J., assignors to Union Carbide and Carbon Corporation, a corporation of New York No Drawing. Application April 15, 1953,
Serial No. 349,111

7 Claims. (Cl. 260—45.5)

This invention is concerned with stabilizing plastic compositions comprising polystyrene and a synthetic rubber, such as polybutadiene or styrene-butadiene rubbery copolymers. More particularly, the invention relates to inhibiting changes in color of such composition occurring at elevated temperatures and in the presence of oxygen.

Commercial polystyrenes have found wide acceptance as a thermoplastic molding material due to their reasonable cost and ease of molding. Nevertheless, for many applications polystyrene is lacking in adequate resistance to impact. To overcome this impact deficiency, polystyrene has been modified by the incorporation of minor amounts of a synthetic rubber, such as polybutadiene or the rubbery copolymers of styrene and butadiene. Such plastic compositions have been made in various ways as by physically blending a minor amount of rubbery styrene-butadiene copolymers with a major amount of polystyrene; by copolymerizing a major amount of styrene with a small amount of butadiene; by partially polymerizing butadiene and then adding a greater amount of styrene monomer and completing the polymerization; and by interpolymerizing a relatively larger amount of styrene with a smaller amount of a rubbery copolymer of styrene and butadiene. All these blends or mixtures of synthetic rubber-modified polystyrene are generally characterized by a higher impact strength and greater elongation than straight polystyrenes. On the other hand, the synthetic butadiene rubber-modified polystyrenes due to their rubber content require higher processing temperatures than unmodified polystyrene to mill or otherwise mix in fillers, pigments, lubricants and other conventional molding material components. Furthermore, in the subsequent forming operations, such as molding, extruding or laminating, higher temperatures are also required to impart satisfactory fluidity.

At these higher temperatures, and particularly in the presence of atmospheric oxygen the synthetic butadiene rubber-modified polystyrenes tend to darken in color, the extent of change being dependent upon the temperature, duration of exposure, and contact with oxygen, with most of the change occurring on the exposed surfaces of the material.

In the absence of pigments or other coloring matter, the synthetic butadiene rubber-modified polystyrene compositions before exposure to extreme heat and oxygen range in color from colorless to opaque brown masses. Upon heating the unpigmented synthetic rubber-modified polystyrenes in the presence of oxygen, the usual color change is for the composition to pass through stages of yellow, amber, brown and finally black. Pigmented compositions, for example, those containing white pigments, first develop a cream color, and with continued exposure to heat and oxygen turn to tan, and finally dark brown.

It has now been found that the color degradation resulting from exposure to the heat and oxygen conditions normally encountered in heat-processing and/or heat-shaping polystyrene compositions containing as the principal modifier thereof a synthetic rubber of the butadiene type, can be substantially prevented by incorporating in such modified polystyrenes, and preferably before they have been exposed to any considerable degree of heat, relatively small amounts each of an aryl secondary amine and of a hydrocarbon substituted dithiocarbamate metal salt having the formula:

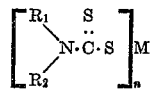

in which $R_1$ and $R_2$ are each a monovalent hydrocarbon group free from olefinic unsaturation and which can be alkyl, aryl, alkaryl and aralkyl, M is a metal, and $n$ is an integer corresponding to the principal valence of the metal, M.

Suitable aryl secondary amines include all purely aromatic amines, and the nuclear alkyl aromatic secondary amines or alkyl aryl secondary amines which do not decompose or do not develop relatively high vapor pressure at the temperatures required for heat-processing or heat-shaping the modified polystyrenes, such temperatures being generally in the range between 150° C. and 280° C.

Examples of suitable specific aromatic secondary amines are the following:

|  | Boiling point |
|---|---|
| Diphenyl amine | 302° C. |
| Phenyl-p-tolylamine | 318° C. |
| Di-o-tolylamine | 313° C. |
| Di-m-tolylamine | 320° C. |
| Di-p-tolylamine | 330° C. |
| Mono-p-heptyl diphenylamine | 280–300° C. at 3 mm. approx. |
| Di-p-heptyl diphenylamine | 280–300° C. at 3 mm. approx. |
| N,N'-di-p-tolyl-phenylenediamine | (decomposes) |
| N-methyl-1-naphthylamine | 293° C. |
| N-ethyl-1-naphthylamine | 305° C. |
| N-propyl-1-naphthylamine | ca. 317° C. |
| N-phenyl-1-naphthylamine | 335° C. (258 mm.) |
| N-o-tolyl-2-naphthylamine | 400° C. |
| N-methyl-2-naphthylamine | 308–310° C. (298 mm.) |
| Di-2-naphthylamine | 471° C. |
| Di-octyl diphenylamine | 305° C. (3 mm.) appr. |
| Mono-octyl diphenylamine | 305° C. (3 mm.) appr. |

Either a single aromatic secondary amine or a mixture of such amines can be used effectively.

Examples of metal salts of disubstituted dithiocarbamic acids effective in the practice of this invention are illustrated by the following:

Zinc diisoamyl dithiocarbamate
Zinc diethyl dithiocarbamate
Zinc dibutyl dithiocarbamate
Zinc dimethyl dithiocarbamate
Zinc dibenzyl dithiocarbamate
Zinc n-ethyl-n-phenyl dithiocarbamate
Zinc octadecyl dithiocarbamate
Zinc phenyl ethyl dithiocarbamate
Copper dimethyl dithiocarbamate
Copper diethyl dithiocarbamate
Selenium diethyl dithiocarbamate
Tellurium dimethyl dithiocarbamate
Cadmium dibutyl dithiocarbamate
Calcium dimethyl dithiocarbamate
Sodium diethyl dithiocarbamate
Sodium dioctyl dithiocarbamate
Lead dimethyl dithiocarbamate Strontium dimethyl dithiocarbamate
Nickel dibutyl dithiocarbamate
Nickel dimethyl dithiocarbamate
Tin dibutyl dithiocarbamate
Antimony dibutyl dithiocarbamate
Bismuth dimethyl dithiocarbamate Some of the metal salts are somewhat highly colored themselves and for this reason may introduce slight changes in color in the synthetic rubber-modified polystyrene, particularly if used in large amounts. For instance, technical grades of selenium diethyl dithiocarbamates have an orange-yellow color, whereas the dimethyl salt has a yellow color. Copper dimethyl dithiocarbamate of technical grade has a dark reddish brown color and tellurium diethyl dithiocarbamate has a yellow-orange color.

The preferred dithiocarbamate salts are those containing as the metal ion, zinc, cadmium or lead, since the salts of these metals are in most instances of a light color or at least of a neutral color, such as gray. This class of dithiocarbamate salts are particularly desirable in synthetic rubber-modified polystyrene containing white or pastel color pigments.

The presence of both types of stabilizers are required in the modified composition, since the presence of either type alone has been found ineffective to stabilize against color degradation due to exposure to heat and oxygen. This requirement is demonstrated by the data accompanying the subsequent examples.

The amount of each type of stabilizer required to produce an effective color stabilizing effect can be as little as 0.25% on the weight of the synthetic rubber-modified polystyrene for each stabilizer. Amounts more than 5% of each type of stabilizer on the modified polystyrene do not appear necessary from the experimental data thus far noted to obtain maximum stabilizing effect and may on the other hand, with the more highly colored stabilizer types introduce objectionable coloring effects.

The incorporation of the aforedescribed stabilizers in the synthetic rubber-modified polystyrenes is preferably done before the modified polystyrene has been subjected to any considerable degree of heat. The stabilizers can be added to the butadiene rubber-modified polystyrene by conventional compounding such as mixing in a Banbury, screw extruder-compounders and heated mixing rolls. In the instance of synthetic rubber-modified polystyrenes produced by blending polystyrene emulsions and synthetic rubber latices, or by emulsion polymerizing styrene monomer in admixture with the synthetic rubber latices, it has been found desirable to incorporate at least the aryl secondary amine to protect the modified polystyrene against oxidative effects while being heated to remove water and to protect the dried material against oxidation in storage.

The following examples further illustrate the practice of the invention:

*Example 1*

A synthetic rubber-modified polystyrene was prepared by mixing together at room temperature 25 parts of GR–S type latex of 60% solids (being a synthetic rubber copolymer comprising 30% styrene and 70% butadiene) and 212.5 parts of polystyrene emulsion (40% solids), the polystyrene having an average molecular weight of 80,000 as calculated by the Staudinger formula. There were then added to the mixture 0.50 part by weight of mono- and di-octyl diphenylamine (which contains a sufficient amount of the mono octyl diphenylamine to prevent crystallization and is sold under the trade-name "AgeRite Stalite") in the form of an aqueous dispersion, per 100 parts solids of the rubber-polystyrene blend. The blend was then drum dried at a temperature of 155° C. A white-pigmented molding composition was prepared by mixing on heated rolls at 155° C. until a uniform mix was obtained, the following composition:

| | Parts by weight |
|---|---|
| Rubber-polystyrene blend | 100 |
| Mineral oil | 2 |
| Zinc oxide | 2 |
| Titanium dioxide | 6 |
| Ultramarine blue | 0.0395 |
| Oil violet special Z, a dye | 0.001 |
| Zinc dibutyl dithiocarbamate | 0.5 |

The resultant composition was examined for color stability by exposing strips of the composition removed from the heated rolls in an oven containing an air atmosphere at a constant temperature of 175° C. At the end of one hour oven treatment, the sample strips still retained their white color. Continuing the oven treatment for another hour at the same temperature resulted in the strips starting to change to a tan color. Another sample treated for one hour at 200° C. in an oven turned brown. In contrast to these results a duplicate sample of the same white-pigmented composition containing only the aforedescribed mono- and di-octyl diphenylamines mixture, and no dithiocarbamate salt developed a pronounced tan color after a one-hour oven treatment at 175° C. and with an additional one-hour exposure turned to a slightly darker tan.

*Example 2*

The same pigmented composition described in Example 1 except that 0.5 part of zinc diethyl dithiocarbamate and 0.25 part of a commercial mixture of mono- and di-octyl diphenylamines were used as the stabilizers, resulted in a stabilized composition that maintained its white color after two hours' exposure at 175° C. in an air atmosphere. This stabilized composition maintained its white color after ageing for one hour at the higher temperature of 200° C., but with an additional hour's exposure at this temperature developed a tan color.

*Example 3*

Substituting in the pigmented composition described in Example 1, 0.5 percent of zinc dibenzyl dithiocarbamate and 0.25% of the mixture of mono- and di-octyl diphenylamines resulted in a stabilized composition capable of maintaining its white color when exposed to oxygen atmosphere at 175° C. With continued exposure for a total of two hours at this temperature, the color of the composition had changed very slightly, being equivalent to a very light cream color.

*Example 4*

Again using the rubber-modified polystyrene composition of Example 1, containing pigmented matter and other ingredients as therein described, but substituting 0.25 percent of the mixture of mono- and di-octyl diphenylamines and 0.5% of cadmium dibutyl dithiocarbamate for the stabilizers of Example 1 yielded a stabilized composition which could be maintained for two hours at a temperature of 175° C. in an oxygen containing atmosphere before developing a light cream color.

*Example 5*

The rubber-modified polystyrene composition of Example 1 in this instance was modified by incorporating 0.25% of the mixture of mono- and di-octyl diphenylamines and 0.5% of lead dimethyl dithiocarbamate in place of the stabilizers used in Example 1. This yielded a stabilized product which maintained its white color for over two hours when held at a temperature of 175° C. in an oxygen-containing atmosphere.

*Example 6*

A synthetic rubber-modified polystyrene was prepared by mixing together at room temperature 50 parts of GR–S type latex of 60% solids (containing a synthetic rubber copolymer comprising 70% butadiene and 30% styrene) and 175 parts of polystyrene emulsion (40% solids), the polystyrene having an average molecular weight of 80,000 as calculated by the Staudinger formula. There were then added to the mixture 0.25 part of the mixture of mono- and di-octyl diphenylamine in the form of an aqueous dispersion per 100 parts of solids of the rubber-polystyrene blend. The mixture was then drum dried and compounded with the same pigmented composition as described in Example 1 except 0.5 part of zinc diethyl dithiocarbamate was substituted for the zinc dibutyl dithiocarbamate as a heater stabilizer. Samples of the resultant product exposed to an oxygen atmosphere at 175° C. for two hours retained their white color.

*Example 7*

Again using the butadiene rubber-modified polystyrene composition of Example 6, containing the pigmented composition of Example 1, but substituting 0.5 part of di-octyl diphenylamine (which is sold under the tradename "Octamine") and 0.5 part of zinc diethyl dithiocarbamate for the stabilizers yielded a composition which could be maintained for two hours at 175° C. in an oxygen containing atmosphere and still retain its white color. A duplicate sample of the same white-pigmented composition containing only the di-octyl diphenylamine and no dithiocarbamate salt developed a pronounced tan color after a one-hour oven treatment at 175° C.

*Example 8*

A synthetic rubber-modified polystyrene was prepared by mixing a GR–S latex of 60% solids and which was a copolymer of 70% butadiene and 30% styrene with an emulsion of styrene monomer and a polymerization catalyst and reacting to form a modified polystyrene containing about 30% by weight of the original butadiene-styrene rubbery copolymer. There was then added to 100 parts of solids of the reacted product 0.5 part by weight of di-octyl diphenylamine and 0.5 part by weight of zinc diethyl dithiocarbamate, both in the form of aqueous dispersions. The stabilized latex was then drum dried on a double drum drier at a temperature of approximately 155° C. The same white-pigmented molding composition as described in Example 1 (except the dithiocarbamate salt was omitted at this point) was then prepared with the drum dried resin by mixing on a heated two-roll mill at 155° C. until a uniform mix was obtained. This yielded a stabilized product which maintained its white color for over two hours at 175° C. in an oxygen-containing atmosphere.

The stabilized compositions of this invention can be satisfactorily compression molded at 150°–175° C. and injection molded at material temperatures between about 190° C. and 280° C. and in the time cycles normally required for this type of material without developing a noticeable or objectionable color change. Extrusion temperatures in the range between 180° C. and 220° C. cause no objectionable change in color. Furthermore, the so stabilized synthetic rubber-modified polystyrene composition can be compounded in Banbury, two-roll mills and other heated mixing equipment without discoloration, whereas the same composition containing no stabilizers will severely discolor under these conditions and are likely to oxidize at room temperature.

What is claimed is:

1. Moldable compositions resistant to heat and oxidation consisting essentially of a thermoplastic composition selected from the group consisting of (I) blends of a homopolymer of styrene and a rubbery butadiene-styrene copolymer and (II) a thermoplastic material formed by polymerizing styrene in the presence of a rubbery butadiene-styrene copolymer, the amount of rubbery butadiene-styrene copolymer in said thermoplastic composition being from 15 percent to 30 percent by weight of the total composition, said composition containing stabilizing amounts of an aryl secondary amine having a boiling point above 290° C. and selected from the group consisting of purely aromatic secondary amines, nuclear alkyl substituted aromatic secondary amines, and alkyl aryl secondary amines, and of a metal salt of a disubstituted dithiocarbamic acid, said salt having the formula:

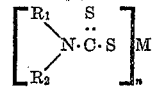

in which $R_1$ and $R_2$ are each monovalent hydrocarbon group free from olefinic unsaturation, M is a metal and $n$ is an integer corresponding to the principal valence of the metal, M, said secondary amine and said metal salt each constituting between about 0.25 percent and 5 percent by weight of the thermoplastic composition.

2. Moldable composition according to claim 1, in which the metal of the dithiocarbamate salt is zinc.

3. Moldable composition according to claim 1 in which the metal of the dithiocarbamate salt is lead.

4. Moldable composition according to claim 1 in which the metal of the dithiocarbamate salt is cadmium.

5. Moldable composition according to claim 1 in which the aromatic amine stabilizer is a mixture of mono- and di-octyl diphenylamines.

6. Moldable compositions resistant to heat and oxidation consisting essentially of a thermoplastic composition selected from the group consisting of (I) blends of a homopolymer of styrene and a rubbery butadiene-styrene copolymer and (II) a thermoplastic material formed by polymerizing styrene in the presence of a rubbery butadiene-styrene copolymer, the amount of rubbery butadiene-styrene copolymer in said thermoplastic composition being from 15 percent to 30 percent by weight of the total composition, said composition containing as stabilizers therefor between about 0.25 percent and 5 percent by weight of the thermoplastic composition of zinc diethyl dithiocarbamate and between about 0.25 percent and 5 percent by weight of the thermoplastic composition of a mixture of mono- and di-octyl diphenylamines.

7. Moldable compositions resistant to heat and oxidation consisting essentially of a thermoplastic composition selected from the group consisting of (I) blends of a homopolymer of styrene and a rubbery butadiene-styrene copolymer and (II) a thermoplastic material formed by polymerizing styrene in the presence of a rubbery butadiene-styrene copolymer, the amount of rubbery butadiene-styrene copolymer in said thermoplastic composition being from 15 percent to 30 percent by weight of the total composition, said composition containing as heat and oxygen stabilizers a small amount of an aryl secondary amine which does not decompose or develop a high vapor pressure at temperatures required to heat-shape the polystyrene composition and selected from the group consisting of purely aromatic secondary amines, nuclear alkyl substituted aromatic secondary amines and alkyl aryl secondary amines, and a small amount of a metal salt of a disubstituted dithiocarbamic acid, said salt having the formula:

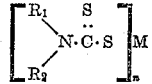

in which $R_1$ and $R_2$ are each a monovalent hydrocarbon group free from olefinic unsaturation and selected from the group consisting of alkyl, aryl, and benzyl, M is a metal selected from the group consisting of antimony, bismuth, cadmium, copper, lead, nickel, selenium, sodium, strontium, tellurium, tin and zinc; and $n$ is an integer corresponding to the principal valence of the metal, said secondary amine and said metal salt each constituting between about 0.25 percent and 5 percent by weight of the thermoplastic composition.

(References on following page)

References Cited in the file of this patent

UNITED STATES PATENTS

| | | |
|---|---|---|
| 2,208,327 | Stowe | July 16, 1940 |
| 2,287,188 | Matheson et al. | June 23, 1942 |
| 2,414,803 | D'Alelio | Jan. 28, 1947 |
| 2,540,996 | Ryden | Feb. 6, 1951 |
| 2,628,952 | Sanders et al. | Feb. 17, 1953 |

OTHER REFERENCES

Aiken: Modern Plastics, volume 26, No. 2, October 1948, pages 99 to 103.

Modern Plastics, December 1949, pages 111–112.